(12) United States Patent
Scholz et al.

(10) Patent No.: US 10,843,114 B2
(45) Date of Patent: Nov. 24, 2020

(54) FILTER ARRANGEMENT FOR A MOBILE DEVICE

(71) Applicant: Carl Freudenberg KG, Weinheim (DE)

(72) Inventors: Tobias Scholz, Viernheim (DE); Oliver Kurtz, Rauenberg (DE); Ulrich Stahl, Laudenbach (DE); Anette Arnold, Seeheim-Jugenheim (DE); Volker Braeunling, Heppenheim (DE)

(73) Assignee: CARL FREUDENBERG KG, Weinheim (DE)

( * ) Notice: Subject to any disclaimer, the term of this patent is extended or adjusted under 35 U.S.C. 154(b) by 256 days.

(21) Appl. No.: 15/901,902

(22) Filed: Feb. 22, 2018

(65) Prior Publication Data

US 2018/0250624 A1  Sep. 6, 2018

(30) Foreign Application Priority Data

Mar. 6, 2017 (EP) ..................................... 17159367

(51) Int. Cl.
*B01D 53/04* (2006.01)
*B01D 46/52* (2006.01)
(Continued)

(52) U.S. Cl.
CPC ....... *B01D 46/521* (2013.01); *B01D 46/0023* (2013.01); *B01D 46/0036* (2013.01);
(Continued)

(58) Field of Classification Search
CPC ............ B01D 46/0023; B01D 46/0036; B01D 46/10; B01D 46/521; B01D 53/0407; B01D 2253/102; B01D 2253/108; B01D 2253/3425; B01D 2257/106; B01D 2257/404; B01D 2257/7027;
(Continued)

(56) References Cited

U.S. PATENT DOCUMENTS 4,917,862 A * 4/1990 Kraw ..................... B01D 46/10
422/122
5,562,407 A * 10/1996 Cielo ................. B01D 46/0023
415/121.2
(Continued)

FOREIGN PATENT DOCUMENTS

CN  104807103 A   7/2015
DE  102005031182 A1   1/2007
(Continued)

*Primary Examiner* — Frank M Lawrence, Jr.
(74) *Attorney, Agent, or Firm* — Leydig, Voit & Mayer, Ltd.

(57) ABSTRACT

A filter arrangement for a mobile device includes at least one first filter element and at least one second filter element, which are arranged in an air duct of the mobile device. The at least one first filter element is a pleated filter and the at least one second filter element is an adsorption filter. The at least one first filter element and the at least one second filter element are separate and mounted in the air duct so as to be mutually spaced. The at least one first filter element includes at least one nonwoven layer. The at least one second filter element is a honeycomb filter including a plurality of channels which are delimited by channel walls.

8 Claims, 2 Drawing Sheets

(51) Int. Cl.
  *B01D 46/00* (2006.01)
  *B01J 20/20* (2006.01)
  *B01J 20/16* (2006.01)
  *B01J 20/28* (2006.01)
  *B01D 46/10* (2006.01)
  *B60H 3/06* (2006.01)

(52) U.S. Cl.
  CPC ......... *B01D 46/10* (2013.01); *B01D 53/0407* (2013.01); *B01J 20/16* (2013.01); *B01J 20/20* (2013.01); *B01J 20/28045* (2013.01); *B60H 3/0658* (2013.01); *B01D 2253/102* (2013.01); *B01D 2253/108* (2013.01); *B01D 2253/3425* (2013.01); *B01D 2257/106* (2013.01); *B01D 2257/404* (2013.01); *B01D 2257/7027* (2013.01); *B01D 2257/90* (2013.01); *B01D 2259/4566* (2013.01); *B01D 2279/40* (2013.01); *B60H 2003/0691* (2013.01)

(58) Field of Classification Search
  CPC ........ B01D 2257/90; B01D 2259/4566; B01D 2279/40; B01J 20/16; B01J 20/20; B01J 20/28045; B60H 3/0658; B60H 3/0608; B60H 2003/0691
  USPC ......... 55/385.3, 315; 96/134, 136, 139, 142; 123/198 E
  See application file for complete search history.

(56) References Cited

U.S. PATENT DOCUMENTS

| | | | | |
|---|---|---|---|---|
| 5,613,991 | A * | 3/1997 | Esaki | B01D 46/0006 454/158 |
| 6,152,990 | A * | 11/2000 | Allen | B01D 53/02 95/107 |
| 6,464,761 | B1 * | 10/2002 | Bugli | F02M 35/024 123/198 E |
| 9,308,484 | B1 * | 4/2016 | Harper | B01D 46/44 |
| 2002/0139251 | A1 * | 10/2002 | Simmons | B60H 3/0608 96/134 |
| 2003/0066427 | A1 * | 4/2003 | Ishida | B01D 46/0023 96/135 |
| 2004/0031248 | A1 * | 2/2004 | Lindsay | B60H 3/06 55/385.3 |
| 2008/0168902 | A1 * | 7/2008 | Suzuki | B01D 53/0407 96/109 |
| 2009/0301308 | A1 * | 12/2009 | Leister | B01D 39/163 96/142 |
| 2016/0298663 | A1 | 10/2016 | Stahl | |

FOREIGN PATENT DOCUMENTS

| | | |
|---|---|---|
| EP | 3015155 A1 | 5/2016 |
| EP | 3081909 A1 | 10/2016 |
| JP | 2001070420 A | 3/2001 |
| JP | 2014104447 A | 6/2014 |

* cited by examiner

FILTER ARRANGEMENT FOR A MOBILE DEVICE

CROSS-REFERENCE TO PRIOR APPLICATION

Priority is claimed to European Patent Application No. EP 17 159 367.6, filed on Mar. 6, 2017, the entire disclosure of which is hereby incorporated by reference herein.

FIELD

The invention relates to a filter arrangement for a mobile device, comprising at least one first filter element and one second filter element, which are arranged in an air duct of the mobile device, the first filter element being a pleated filter and the second filter element being an adsorption filter.

BACKGROUND

It is known to use filter arrangements to treat the air in motor vehicle cabins. A filter arrangement in which the filtration tasks of adsorption filtration and particle filtration are combined in one filter is known from EP 3 015 155 A1. In this case, the filter layer designed as a particulate filter retains particulate components from the inlet air, for example dust and pollen. The filter layer designed as an adsorption filter retains undesirable gaseous components from the inlet air, for example noxious gases, odors, benzene or ozone.

In the embodiment of the filter element as an interior filter for mobile devices, the filtration functions have until now been combined in one single component. A disadvantage in this case is that it is only possible to combine filtration functions which, on account of the design, can be arranged in one single filter element.

SUMMARY

In an embodiment, the present invention provides a filter arrangement for a mobile device, comprising: at least one first filter element and at least one second filter element, which are arranged in an air duct of the mobile device, wherein the at least one first filter element comprises a pleated filter and the at least one second filter element comprises an adsorption filter, wherein the at least one first filter element and the at least one second filter element are separate and mounted in the air duct so as to be mutually spaced, wherein the at least one first filter element comprises at least one nonwoven layer, and wherein the at least one second filter element comprises a honeycomb filter comprising a plurality of channels which are delimited by channel walls.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
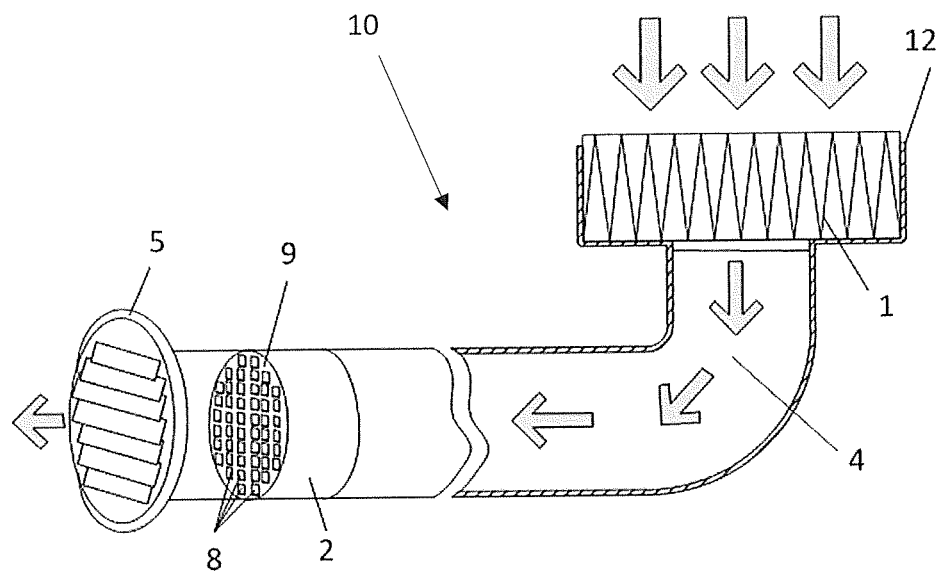
FIG. 1 shows a filter arrangement.

In an embodiment, the present invention provides the first filter element and the second filter element that are separate from one another and are mounted in the air duct so as to be mutually spaced. The first filter element and the second filter element therefore have separate functions, such that the two filter elements can be independent of one another. It is in particular unnecessary in this case to be able to combine the second filter element, designed as an adsorption filter, with the first filter element, designed as a particulate filter in the form of a pleated filter, into one single filter element. The second filter element can thus be designed so as to allow high filtration capacity of the through-flowing air while also limiting pressure loss.

The first filter element is a pleated filter comprising at least one layer made of a nonwoven. Pleated filters made of nonwovens are economical and have a high filtration capacity because of the relatively large filtration surface area.

According to the invention, the second filter element is a honeycomb filter comprising a plurality of channels which are delimited by channel walls. A filter of this kind has particularly low air resistance. At the same time, the plurality of channels delimited by channel walls results in a large filtration surface area which has a particularly high gas filtration capacity. A honeycomb filter can be adapted particularly well to specific applications with regard to the desired air resistance and the desired gas adsorption capacity. To this end, the outer dimensions, length and number of channels, as well as the cross-sectional area of the channels, can be modified.

The honeycomb filter can be designed in segments, a plurality of segments in the shape of honeycomb bodies being held in a support frame and assembled to form a honeycomb filter.

The second filter element can comprise activated carbon. The second filter element can also consist entirely of activated carbon. Alternatively, it is also conceivable for the activated carbon to be mixed with other adsorbent materials. The use of silicic acid is in particular conceivable here. Activated carbon and/or mixtures of activated carbon and silicic acid are mixed with a binding agent and shaped into a honeycomb filter. Filters of this kind have a high filtration capacity for removing undesirable gaseous components.

An advantageous honeycomb body and/or honeycomb filter comprises at least 55 wt. % activated carbon. The honeycomb filter can also comprise admixtures. Advantageous admixtures are, for example, glassy carbon and/or aluminosilicate. The cell density of the honeycomb body, i.e. the number of channels per unit of area, is preferably between 10 and 120 cells/cm$^2$, particularly preferably between 40 and 95 cells/cm$^2$.

The air duct can comprise at least one vent, the second filter element being associated with the vent. It is advantageous if gaseous components, which can cause odors, can be removed directly upstream of the vent, so that gaseous components which originate inside the mobile device are also removed.

The second filter element can form a flow straightener. In particular, when the second filter element is a honeycomb filter, the inlet air is homogenized when said air passes through the relatively long channels of the honeycomb filter. The straightening of the flow reduces noise, such that noise emissions of the inlet air duct are reduced.

The second filter element can form a functional unit together with the vent. Moreover, the second filter element can be mounted in parts of the inlet air duct which are difficult to reach. In particular, it is not necessary to dismantle the vent to exchange the second filter element. In this embodiment, the second filter element can be designed to last for the entire operating life of the mobile device, and therefore it is not necessary to exchange the second filter element.

An air duct comprising a filter arrangement for mobile devices according to the invention has an air conditioning device, an air conveying unit and a filter arrangement, it being possible for filter elements of the filter arrangement to be arranged, individually or in groups, upstream and/or downstream of the air conveying unit when viewed in the flow direction. An advantage of this embodiment is that particles transported in the inlet air, such as dust and pollen, are retained by the first filter element. A further filter element removes gaseous components from the inlet air. Gaseous components emitted by the air conveying unit are also removed. Said components can be ozone produced by the electric motor of the air conveying unit, for example.

In an advantageous air duct, a first filter element is arranged upstream of the air conveying unit when viewed in the flow direction, and a second filter element is arranged downstream of the air conveying unit. In this case, the first filter element is a particulate filter and the second filter element is an adsorption filter.

The air duct can comprise a first air duct for the inlet air and a second air duct for the circulating air. One or more separate filter elements can be provided for each air duct. Filter elements which filter both air ducts simultaneously can also be provided. Removing substances emitted from the interior of the mobile device is in particular relevant to filtering the circulating air, whereas removing noxious gases is desirable for filtering the inlet air. Therefore, in an advantageous embodiment, filter elements which differ from the second filter element are provided for the inlet air and the circulating air.

A particularly effective way of depositing both particles and noxious gases can be achieved by combining a first filter element in the form of a pleated filter with a separate second filter element in the form of a honeycomb filter.

In an alternative embodiment, the first filter element can be a preliminary filter, and a third filter element can be arranged between the first filter element and the second filter element. In this case, a first filter element can be a coarse filter, a second filter element can be an adsorption filter and a third filter element can be a fine filter. In this embodiment, particles conveyed with the inlet air are retained by the filter element designed as a coarse filter. Finer particles, in particular those originating within the inlet air duct of the mobile device, are retained by the filter element designed as a fine filter, preferably the third filter element. Undesirable gaseous admixtures are retained by the second filter element.

FIG. 1 shows a filter arrangement 10 for a mobile device, comprising at least one first filter element 1 and one second filter element 2, which are arranged in an air duct 4 of the mobile device.

The first filter element 1 is a particulate filter. The first filter element 1 is therefore a pleated filter comprising at least one nonwoven layer. The first filter element 1 is arranged in a filter housing 12 so as to be exchangeable, said filter housing being part of the air duct 4.

The second filter element 2 is an adsorption filter. The second filter element 2 is a honeycomb filter. The honeycomb filter comprises one or more honeycomb bodies having a plurality of channels 8 which are delimited by channel walls 9. The present honeycomb filter is composed in segments of a plurality of honeycomb bodies. The honeycomb bodies are secured in a support frame, the support frame being designed such that it forms a sealing surface relative to the filter housing. In an alternative embodiment, the honeycomb bodies can be assembled into a honeycomb filter by being integrally bonded to one another. The sealing surface can also be provided in the air duct 4.

In the present embodiment, the second filter element 2 comprises activated carbon. In order to produce said element, activated carbon is formed into the honeycomb shape by means of extrusion. The second filter element 2 is cylindrical and introduced into the tubular air duct as an insert.

In an advantageous embodiment, the support frame is tubular and is arranged in the tubular air duct of an air conditioning unit, in particular a mobile air conditioning unit. The air duct often has a circular or rectangular cross-section, and therefore the support frame is designed to be correspondingly round or rectangular.

The honeycomb bodies of the present embodiment are 65% activated carbon and 35% admixtures, an admixture being in particular glassy carbon. The cell density, i.e. the number of channels per unit of area, is 60 cells per square centimeter.

The first filter element 1 and the second filter element 2 are separate and mounted in the air duct 4 so as to be mutually spaced. The first filter element 1 is arranged in the air duct 4 on the inflow side thereof and prevents particulate impurities from entering the air duct and the cabin of the mobile device. The second filter element 2 is arranged in the air duct 4 on the outflow side thereof and prevents undesirable gaseous admixtures from entering the cabin of the mobile device.

The air duct 4 comprises a plurality of vents 5 for ventilating the cabin of the mobile device. In the present embodiment, each vent 5 is associated with a second filter element 2. The second filter element 2, designed as a honeycomb body, forms a flow straightener and reduces outflow noise in the air duct 4.

The mobile device is in particular a motor vehicle.

Figure 2:
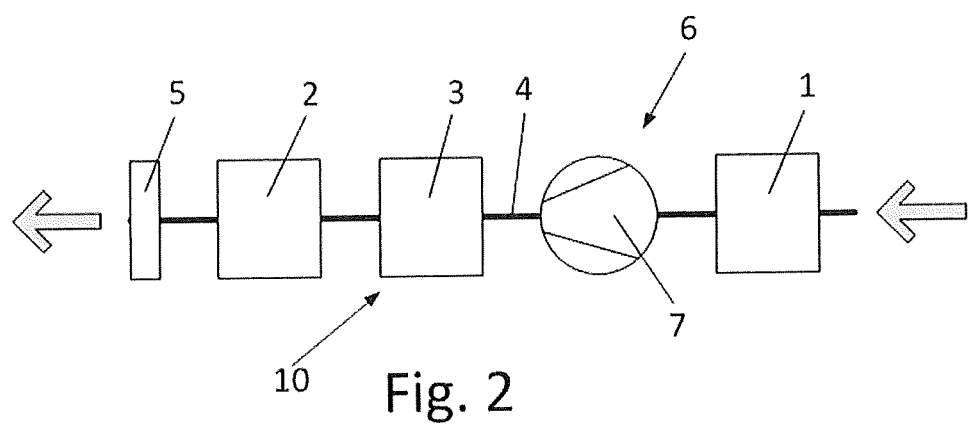
FIG. 2 shows a filter arrangement for a mobile device comprising an air conditioning unit.

FIG. 2 shows an air duct 4 for mobile devices, comprising an air conditioning unit 6, an air conveying unit 7 and a filter arrangement 10 according to FIG. 1.

The first filter element 1 is arranged upstream of the air conveying unit 7 when viewed in the flow direction, and the second filter element 2 is arranged downstream of the air conveying unit 7 when viewed in the flow direction. Furthermore, an evaporator of the air conditioning unit 6 is arranged between the first filter element 1 and the second filter element 2.

The first filter element 1 is a preliminary filter. A third filter element 3 is arranged between The air conveying unit 7 and the second filter element 2. The first filter element 1 forms a coarse filter, the second filter element 2 forms an adsorption filter and the third filter element 3 forms a fine filter. Like the first filter element 1, the third filter element 3 is a pleated filter and is arranged in the air duct 4 so as to be exchangeable.

The second filter element 2 is a honeycomb filter and comprises activated carbon. The second filter element 2 is likewise arranged in the air duct 4 so as to be exchangeable.

In an alternative embodiment, the second filter element 2, in particular in the embodiment thereof as a honeycomb filter, can form an integral unit with the vent 5 and can also be designed to last for the entire operating life of the mobile device.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A mobile device filtration unit, comprising:
    an air conditioning unit;
    an air conveying unit; and
    a filter arrangement, comprising:
        an air duct; and
        at least one first filter element and at least one second filter element, which are arranged in the air duct,
    wherein the at least one first filter element comprises a pleated filter and the at least one second filter element comprises an adsorption filter,
    wherein the at least one first filter element and the at least one second filter element are separate and mounted in the air duct so as to be mutually spaced,
    wherein the at least one first filter element comprises at least one nonwoven layer,
    wherein the at least one second filter element comprises a honeycomb filter comprising a plurality of channels which are delimited by channel walls,
    wherein the air duct comprises at least one vent,
    wherein the at least one second filter element is associated with the at least one vent, and
    wherein the at least one second filter element forms a functional unit together with the at least one vent.

2. The mobile device filtration unit according to claim 1, wherein at least one filter element is arranged upstream of the air conveying unit when viewed in a flow direction, and at least one further filter element is arranged downstream of the air conveying unit when viewed in the flow direction.

3. The mobile device filtration unit according to claim 1, wherein the at least one first filter element, which comprises a particulate filter, is arranged upstream of the air conveying unit when viewed in a flow direction, and the at least one second filter element is arranged downstream of the air conveying unit.

4. The mobile device filtration unit according to claim 1, wherein the at least one first filter element comprises a preliminary filter.

5. The mobile device filtration unit according to claim 1, further comprising a third filter element.

6. The mobile device filtration unit according to claim 5, wherein the at least one first filter element comprises a preliminary filter and the third filter element comprises a fine filter.

7. The mobile device filtration unit according to claim 1, wherein the at least one second filter element comprises activated carbon.

8. The mobile device filtration unit according to claim 1, wherein the at least one second filter element forms a flow straightener.

* * * * *